(12) United States Patent
Oishi

(10) Patent No.: US 6,807,028 B1
(45) Date of Patent: Oct. 19, 2004

(54) CORE CENTER FOR MAGNETIC DISK

(75) Inventor: Kengo Oishi, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 284 days.

(21) Appl. No.: 10/031,615

(22) PCT Filed: Jul. 6, 2000

(86) PCT No.: PCT/JP00/04481
§ 371 (c)(1),
(2), (4) Date: Jan. 22, 2002

(87) PCT Pub. No.: WO01/08156
PCT Pub. Date: Feb. 1, 2001

(30) Foreign Application Priority Data
Jul. 22, 1999 (JP) .......................................... 11/207740

(51) Int. Cl.⁷ .............................................. G11B 23/00
(52) U.S. Cl. ..................................................... 360/135
(58) Field of Search ................................ 360/133, 135; 369/270, 271, 282, 290; 720/721, 722, 723, 724, 715, 716

(56) References Cited
U.S. PATENT DOCUMENTS 4,654,733 A * 3/1987 Kawakami et al. ...... 360/99.04
5,761,016 A * 6/1998 Watanabe .................... 360/133
6,061,215 A * 5/2000 Tomita ......................... 360/133
6,307,713 B1 * 10/2001 Miyata et al. ............... 360/135

FOREIGN PATENT DOCUMENTS

| JP | 4-52859 | | 12/1992 |
|---|---|---|---|
| JP | 6-168559 | * | 6/1994 |
| JP | 2000-48513 | | 2/2000 |
| JP | 2000-90619 | | 3/2000 |
| JP | 2000-260147 | | 9/2000 |

* cited by examiner

Primary Examiner—David Ometz
(74) Attorney, Agent, or Firm—Sughrue Mion, PLLC

(57) ABSTRACT

Stable high speed rotation of magnetic recording media is obtained by improving the manufacturing accuracy of a step portion formed in a center core for a magnetic disc between a standardizing surface portion that abuts a spindle to perform standardizing positioning, and an attraction surface portion that approaches a magnet and is attracted thereby. The center core consists of a standardizing surface portion that performs standardizing positioning in its central portion, an attraction surface portion that faces a magnet at a different height than the standardizing surface portion via a step portion, and a collar portion that is fixed to the magnetic recording media at the outer peripheral portion thereof. The step portion between the standardizing surface portion and the attraction surface portion is formed to be a multiple step drawn form.

6 Claims, 3 Drawing Sheets

F I G. 3
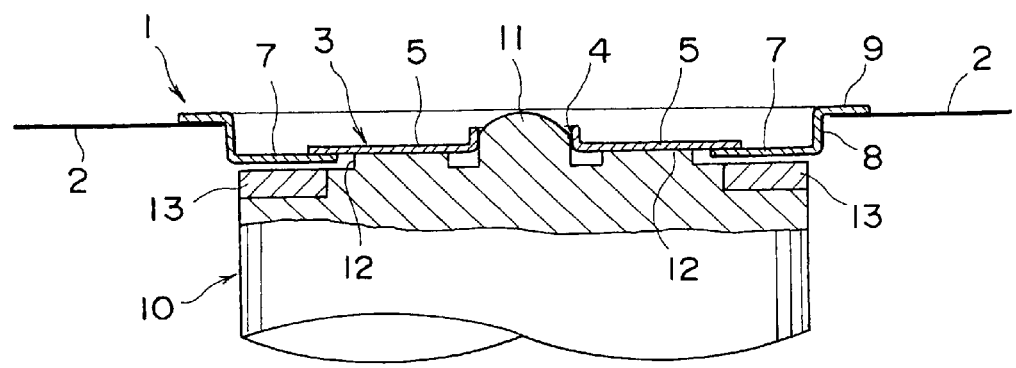
F I G. 4
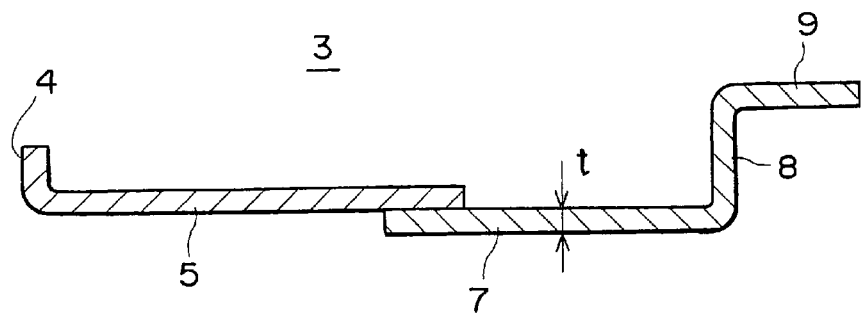

F I G. 5
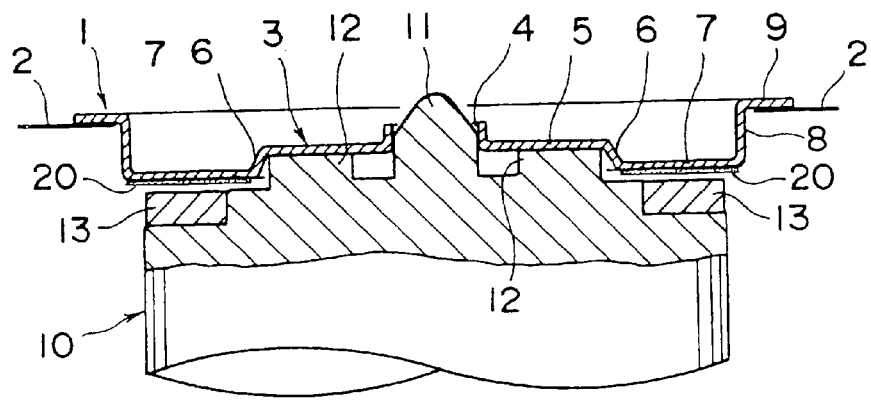
F I G. 6
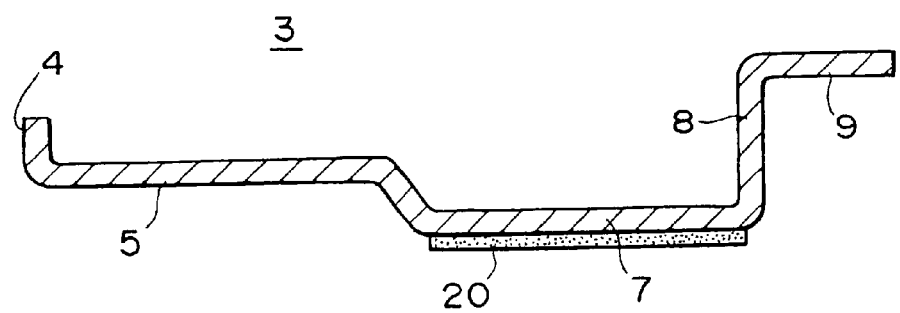
F I G. 7
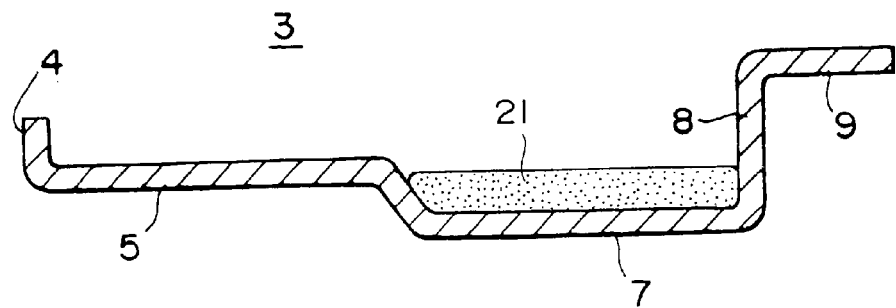

CORE CENTER FOR MAGNETIC DISK

TECHNICAL FIELD

The present invention relates to a center core of a magnetic disc that is fixed to the central portion of a flexible magnetic recording media housed within a magnetic disc cartridge, particularly those of high capacity.

BACKGROUND ART

Conventionally, magnetic disc cartridges of a construction in which a magnetic disc, formed by magnetic layers being formed on both sides of a flexible polyester sheet or the like and having a metallic center core fixed to the central portion of said flexible magnetic recording media are being utilized mainly as recording media for computers. These so-called floppy disks are rotatively driven and magnetic recording is performed on the aforementioned magnetic layers by a magnetic head. These floppy disks have the advantages of being easy to handle, and low cost.

The aforementioned center core supports the magnetic recording media and defines its center of rotation. The center core also serves the function of transmitting the rotational driving force imparted thereon by a chucking portion provided on the tip of a rotation spindle of a drive side rotational drive means, by which it is held. Normally, the aforementioned center core comprises a discoid standardizing surface portion formed in the central portion thereof that abuts the tip portion of the aforementioned spindle to perform standardizing positioning, and a flanged collar portion formed parallel to the standardizing surface portion at the outer periphery thereof that is fixed to the central portion of the magnetic recording media.

The standardizing surface portion is provided with a central aperture into which the central pin of the spindle is inserted. At the same time, a drive pin of the spindle is engaged with a drive aperture which is provided towards the outside from the aforementioned central aperture, and the center core is to be rotationally driven thereby. Further, a magnet is provided at the tip of the spindle that provides a magnetic attraction force to magnetically attract the center core to supplement maintenance of the chucking state.

With regard to magnetic recording media such as that of the magnetic disc described above, as the recording capacity increases, it becomes necessary to rotate the magnetic disc at high speed in order to secure a transfer rate thereof. In addition, the expected recordation/reproduction performance is secured by the strict maintenance of appropriate relative positioning between the magnetic recording media that rotates at high speed and the magnetic head that performs recordation/reproduction.

It has been proposed to increase the magnetic attraction of the center core to the magnet of the aforementioned spindle in order to stably rotate the magnetic disc at high speed. However, it is difficult from a manufacturing standpoint to accurately form the surface of the magnet at a predetermined height. Also, the accuracy in height becomes unstable if the center core and the magnet are magnetically attached in a state of contact. Therefore, to approach the bottom surface of the center core towards the magnet with a predetermined distance therebetween and attracting the center core in this manner is being considered.

However, if the magnetic attraction force is strengthened towards conventional magnetic discs having a lower recording capacity as well, there is a fear that chucking malfunctions will occur. Therefore, for center cores magnetic discs that have high recording capacities, it has been proposed to form the portion of the bottom surface that faces the magnet of the spindle lower than the central standardizing surface portion thereof to approach the surface of the magnet.

That is, a center core formed in this manner comprises a central standardizing surface portion that abuts the tip surface of a spindle to perform standard positioning; an attraction surface portion formed parallel to and of a different height than the standardizing surface around the outer periphery thereof via a step portion that faces the magnet of the spindle; and a collar portion formed around the outer periphery thereof parallel to the aforementioned standardizing surface portion that is fixed to the magnetic recording media.

In addition, a center core formed in this manner comprises a collar portion of the outer periphery thereof, a standardizing surface portion towards the center thereof, an attraction surface portion around the outer periphery of the standardizing surface portion, and a connection portion that connects the attraction surface portion with the collar portion.

However, as a center core as described above is formed with an attraction surface between a standardizing surface portion and a collar portion of a different height therefrom, multiple drawing processes are required in the manufacture thereof. This causes difficulties in securing manufacturing accuracy with regard to the height positioning accuracy of the standardizing surface portion and the collar portion as well as the degree of parallelism therebetween. This in turn causes problems in securing positional accuracy between the magnetic recording media and the magnetic head.

Particularly in the case that the step between the aforementioned attraction surface and the standardizing surface is on the order of a board thickness, there is a propensity for the manufacturing accuracy to be difficult to obtain with regard to a drawing process. A higher degree of parallelism is required, as there is a fear that vertical movement of the magnetic recording media will be generated along with the rotation of the aforementioned magnetic disc.

The present invention has been developed in view of the circumstances described above, and it is a first object of the present invention to provide a center core for a magnetic disc that enables stable high speed rotation of a magnetic recording media, said center core being provided with a stepped formed portion between the standardizing surface portion and the attraction surface, formed by multiple drawing processes, wherein manufacturing accuracy is obtained, and parallelism between the standardizing surface portion and the collar portion, as well as dimensional accuracies thereof are secured.

It is a second object of the present invention to provide a center core for a magnetic disc that enables stable high speed rotation of a magnetic recording media, said center core having improved dimensional accuracies of the standardizing surface portion and the attraction surface, as well as securing parallelism between the standardizing surface portion and the collar portion, as well as dimensional accuracies thereof.

By the attraction surface being formed lower than the standardizing surface portion in a center core as described above, during a state in which a magnetic disc is housed within a case, the aforementioned attraction surface portion protrudes from the hub aperture of said case. This causes a fear that if said case is dropped or the like, the impact will act directly thereon and damage the magnetic recording media.

That is, when the magnetic disc cartridge is in a horizontal state, the standardizing surface portion as well as the attraction surface portion of the aforementioned center core protrudes from the bottom surface of the case. At a time when the disc is dropped or the like, the attraction surface portion of the center core collides with an external member such as a floor, the impact is transmitted directly to the magnetic recording media, and the magnetic recording media suffers damage by colliding with the internal surface of the case. Particularly in a case that the impact on the aforementioned attraction surface portion acts thereon in an oblique manner and the magnetic recording media collides with the internal surface of the case in an oblique manner, the magnetic recording media is more likely to be damaged.

The present invention has been developed in view of the above described circumstances, and it is a third object of the present invention to provide a center core for a magnetic disc that prevents damage to the magnetic recording media by cushioning the impact suffered by the attraction surface portion.

DISCLOSURE OF THE INVENTION

A center core for a magnetic disc according to the present invention that achieves the first object described above is a center core for a magnetic disc which is held by the magnetic attraction force of a magnet provided at the tip of a spindle, said spindle transmitting a rotational driving force to said center core. The center core comprises: a standardizing surface portion formed as a disc in the central portion thereof, that abuts the tip surface of the aforementioned spindle to perform standardizing positioning; an attraction surface portion formed annularly around the outer periphery of said standardizing surface portion via a step portion so that it is parallel to the standardizing surface portion while of a different height, that faces the aforementioned magnet provided at the spindle; and a collar portion formed as a flange around an outer periphery thereof, parallel to said standardizing surface portion, that is fixed to the central portion of a discoid magnetic recording media; wherein the step portion between the standardizing surface portion and the attraction surface portion is of a multiple step drawn form.

It is preferable that the height of each drawn step of the step portion between the standardizing surface portion and the attraction surface is less than or equal to ½ the board thickness.

According to the center core that achieves the first object of the present invention as described above, by forming the step portion, between the standardizing surface portion that abuts the tip surface of the spindle to perform standardizing positioning and the attraction surface portion that faces the magnet of the spindle, in a multiple step drawn form, the manufacturing accuracies thereof are improved. Accordingly, parallelism as well as dimensional accuracies of the standardizing surface portion and the peripheral collar portion to which a magnetic recording media is fixed is secured. Therefore, stable high speed rotation is obtained, enhancing the reliability of the magnetic recordation/ reproduction characteristic of a high recording capacity magnetic recording media.

A center core for a magnetic disc according to the present invention that achieves the second object described above is a center core for a magnetic disc which is held by the magnetic attraction force of a magnet provided at the tip of a spindle, said spindle transmitting a rotational driving force to said center core. The center core comprises: a collar portion formed as a flange on the outer periphery thereof, to which a discoid magnetic recording media is fixed; a standardizing surface portion formed as a disc in a central portion thereof, that abuts the tip surface of the aforementioned spindle to perform standardizing positioning; an attraction surface portion formed annularly around an outer periphery of said standardizing surface portion while lower than said standardizing surface portion, that faces the aforementioned magnet provided at the spindle; and a link portion that links said attraction surface portion and the collar portion; wherein the aforementioned standardizing surface portion and attraction surface portion are formed separately then are joined to each other.

It is preferable that the height of the step between the standardizing surface portion and the attraction surface is formed to be equal to the board thickness of said attraction surface portion.

It is preferable that the link portion a swell as the collar portion are formed integrally on the attraction surface portion. The standardizing surface portion and the attraction surface portion maybe formed separately utilizing different materials. The standardizing surface portion and the attraction surface portion are joined by spot welding or the like.

According to the center core that achieves the second object of the present invention as described above, by forming the standardizing surface portion, that abuts the tip surface of the spindle to perform standardizing positioning, and the attraction surface portion, that faces the magnet of the spindle, separately then joining them, a drawing process of a board thickness between the two portions is obviated, thereby improving and stabilizing the dimensional accuracies thereof. Accordingly, parallelism as well as dimensional accuracies of the standardizing surface portion and the peripheral collar portion, to which a magnetic recording media is fixed is secured. Therefore, stable high speed rotation is obtained, enhancing the reliability of the magnetic recordation/reproduction characteristic of a high recording capacity magnetic recording media.

Particularly if the step between the standardizing surface portion and the attraction surface portion is formed to be a board thickness of the attraction surface portion, further improvements in parallelism and dimensional accuracies can be obtained.

A center core for a magnetic disc according to the present invention that achieves the second object described above is a center core for a magnetic disc which is held by the magnetic attraction force of a magnet provided at the tip of a spindle, said spindle transmitting a rotational driving force to said center core. The center core comprises: a collar portion formed as a flange on the outer periphery thereof, to which a discoid magnetic recording media is fixed; a standardizing surface portion formed as a disc in a central portion thereof, that abuts the tip surface of the aforementioned spindle to perform standardizing positioning; an attraction surface portion formed annularly around an outer periphery of said standardizing surface portion while lower than said standardizing surface portion, that faces the aforementioned magnet provided at the spindle; and a link portion that links said attraction surface portion and the collar portion; wherein the attraction surface portion is provided with an impact absorption member.

It is preferable that the impact absorption member be of a construction in which a plastic film, foam film, or the like are fixed on an outer surface of the attraction surface portion and/or the inner portion of the attraction surface portion is filled with a high viscosity impact absorption material such as foam.

According to the center core that achieves the third object of the present invention as described above, by providing the attraction surface portion with an impact absorption member, the impact suffered by the case when it collides with, for example, a floor, in case it is dropped or the like is absorbed and cushioned by the impact absorption member. Accordingly, the force with which the magnetic recording media collides with the internal surface of the case is reduced, thereby preventing the occurrence of damage thereto. Therefore, the reliability of the magnetic recordation/reproduction characteristic of a high recording capacity magnetic recording media is enhanced.

BRIEF DESCRIPTION OF THE DRAWINGS

FIG. 3 is a sectional front view of a center core for a magnetic disc according to the second embodiment of the present invention, in a state where it is loaded on a spindle.

FIG. 4 is a magnified sectional edge view of half of the center core shown in FIG. 3.

FIG. 5 is a sectional front view of a center core for a magnetic disc according to the third embodiment of the present invention, in a state where it is loaded on a spindle.

FIG. 6 is a magnified sectional edge view of half of the center core shown in FIG. 5.

FIG. 7 is a magnified sectional edge view of half of a center core according to the fourth embodiment of the present invention.

BEST MODE FOR CARRYING OUT THE INVENTION

Hereinafter, the embodiments of the present invention will be described in detail with reference to the attached drawings.

Figure 1:
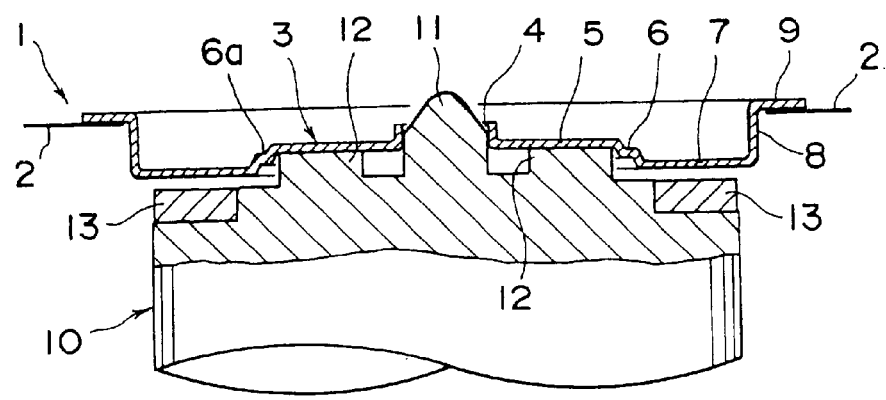
FIG. 1 is a sectional front view of a center core for a magnetic disc according to the first embodiment of the present invention, in a state where it is loaded on a spindle.
Figure 2:
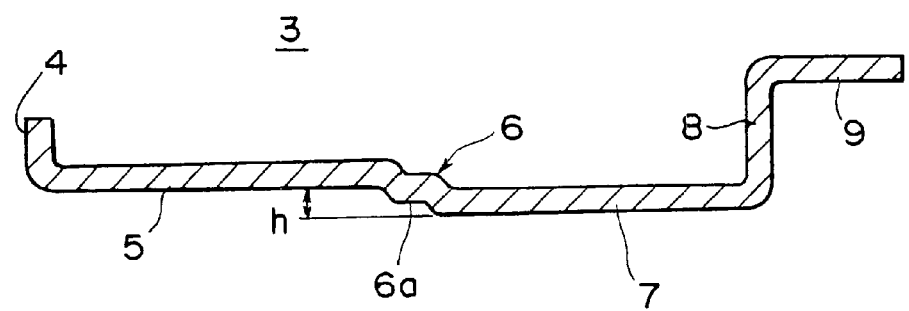
FIG. 2 is a magnified sectional edge view of half of the center core shown in FIG. 1.

FIG. 1 is a sectional front view of a center core for a magnetic disc according to the first embodiment of the present invention, in a state where it is loaded on a spindle, and FIG. 2 is a magnified sectional edge view of half of the center core shown in FIG. 1. Note that the figures are not necessarily drawn to scale; that is, the actual dimensions may not match those of the figures.

The magnetic disc 1 comprises a discoid flexible magnetic recording media 2 and a center core 3 for rotational driving fixed to the central portion of the magnetic recording media 2. The center core 3 is held by the magnetic attraction force of a magnet 13 provided at the tip of a spindle 10, and said spindle 10 transmits a rotational driving force to the center core 3.

A central pin 11 is protrusively provided in the center of the tip of spindle 10. An annular protrusion 12 is provided around the periphery of the central pin 11, concentric thereto, and the annular magnet 13 is provided along a further periphery thereof.

The magnetic recording media is provided as a discoid flexible substrate of polyethylene terephthalate or the like having magnetic layers formed on both sides thereof with a central aperture.

The center core 3 is formed by a sheet of metal having a strong magnetic property, such as magnetic stainless steel, being punched out in a predetermined shape and being press formed (drawing process). A discoid standardizing surface portion 5 is, formed in a central portion of the center core 3. A central aperture 4 is opened at the rotational center of the standardizing surface portion. An attraction surface portion 7 is formed annularly at the outer periphery of the standardizing surface portion 5, parallel thereto while at a lower position, via a step portion 6. A collar portion 9 is formed as an outwardly extending flange at the outer periphery of the center core 3, parallel to the standardizing surface portion while at a higher position. The inner peripheral edge of the collar portion 9 and the outer peripheral edge of the attraction surface portion 7 are connected by a link portion 8, which is an erect tubular wall.

The central portion of the discoid flexible magnetic recording media 2 is fixed to the lower surface of the collar portion 9 by adhesive or the like. Also, a drive pin aperture (not shown) is provided extending from the standardizing surface portion 5 to the attraction surface portion 7.

With regard to the structure described above, the step portion 6 between the standardizing surface portion 5 and the attraction surface portion 7 is formed in a multiple step drawn form (in the figure, a two step drawn form). That is, with regard to the step portion 6, an intermediate step 6a is formed between the standardizing surface portion 5 and the attraction surface portion 7, and a drawing process is performed on both sides of this intermediate step 6a. For example, in the case that the board thickness of the center core is 0.3 mm, the difference in height h (see FIG. 2) between the standardizing surface portion 5 and the attraction surface portion 7, that is, the height of step portion 6, is 0.25 mm. On either side of the intermediate step 6a, a drawn step, each of h/2, that is, 0.125 mm is formed.

Note that as it is preferable for each of the drawn steps of the multiple drawn step structure of step portion 6, which is between the standardizing surface portion 5 and the attraction surface portion 7, to be less than or equal to ½ of the board thickness. Accordingly, the number of steps is set in relation to the height h of step portion 6.

In a state where a center core 3 as described above is chucked on the tip of a spindle 10 as shown FIG. 1, the central pin 11 of the spindle 10 is inserted into the central aperture 4 of the standardizing surface portion 5 of the central core 3, thereby accurately positioning the rotational center. The bottom surface of the standardizing surface portion 5 abuts the terminal surface of the annular protrusion 12 of the spindle 10, thereby accurately positioning the height. Further, the upper terminal surface of the magnet 13 of the spindle 10 is provided low, so as to not contact the bottom surface of the attraction surface portion 7 of the center core. The magnet 13 and the center core face each other while maintaining a predetermined distance therebetween. A strong magnetic attraction force is secured, and the magnet 13 attractively holds the center core 3 so that it neither floats upwards nor shifts in a rotational direction during rotational driving thereof.

Note that a drive pin (not shown) to be inserted into the drive pin aperture of the center core 3 is provided at the tip of the spindle 10. This drive pin is provided mainly so as to be able to drive existing magnetic discs with low recording capacities. However, if the spindle is dedicated to driving magnetic discs 1 with high recording capacities as in the present embodiment, the drive pin need not be formed thereon; also, the drive pin aperture need not be formed in the center core 3, and the rotational driving force may be transmitted solely by the magnetic attraction force of the magnet 13.

According to the first embodiment, in order to increase the magnetic attraction force towards the attraction surface portion 7, said attraction surface portion was formed lower than the standardizing surface portion 5 so that said attraction surface portion 7 approaches the magnet 13 of the spindle 10. The attraction surface portion 7 was made to be lower than the standardizing surface portion 5, via a step portion 6, which was formed of two drawn steps. Each of the drawn steps have a drawing dimension of less than one half of the board thickness, therefore stable formation is able to be performed. Corresponding to improvements in the parallelism and dimensional accuracies of the standardizing surface portion 5 and the attraction surface portion 7, the parallelism and dimensional accuracies of the standardizing surface portion 5 and the collar portion 9 also improve. Thus, stable rotation of the magnetic recording media 2 is performed at a predetermined height in relation to the standardizing position in a flat planar state without vertical movement, which improves the accuracy in the relative position with the magnetic head. Therefore, accuracy in magnetic recordation/reproduction is secured, and reliability is enhanced.

Note that with regard to the magnetic disc 1, it is rotatably housed in a flat case, which is a joined upper shell and lower shell formed of, for example, synthetic resin. The case has a magnetic head insertion opening, and in the central portion of the lower shell is a circular hub aperture of a size that accommodates the standardizing surface portion 5 as well as the attraction surface portion 7, to which the spindle 10 is inserted.

FIG. 3 is a sectional front view of a center core for a magnetic disc according to the second embodiment of the present invention, in a state where it is loaded on a spindle, and FIG. 4 is a magnified sectional edge view of half of the center core shown in FIG. 3.

The magnetic disc 1 comprises a discoid flexible magnetic recording media 2 and a center core 3 for rotational driving fixed to the central portion of the magnetic recording media 2. The center core 3 is held by the magnetic attraction force of a magnet 13 provided at the tip of a spindle 10, and said spindle 10 transmits a rotational driving force to the center core 3.

A central pin 11 is protrusively provided in the center of the tip of spindle 10. An annular protrusion 12 is provided around the periphery of the central pin 11, concentric thereto, and the annular magnet 13 is provided in a lower position along a further periphery thereof.

The magnetic recording media is provided as a discoid flexible substrate of polyethylene terephthalate or the like having magnetic layers formed on both sides thereof with a central aperture.

A discoid standardizing surface portion 5 is formed in a central portion of the center core 3. A central aperture 4 is opened at the rotational center of the standardizing surface portion. An attraction surface portion 7 is formed annularly at the outer periphery of the standardizing surface portion 5, parallel thereto while at a lower position. A collar portion 9 is formed as an outwardly extending flange at the outer periphery of the center core 3, parallel to the standardizing surface portion while at a higher position. The inner peripheral edge of the collar portion 9 and the outer peripheral edge of the attraction surface portion 7 are connected by a link portion 8, which is an erect tubular wall.

The central portion of the discoid flexible magnetic recording media 2 is fixed to the lower surface of the collar portion 9 by adhesive or the like. Also, a drive pin aperture (not shown) is provided extending from the standardizing surface portion 5 to the attraction surface portion 7.

With regard to the structure above, the standardizing surface portion 5 and the attraction surface portion 7 are formed separately, and joined by spot welding or the like. The height of the step between the standardizing surface portion 5 and the attraction surface portion 7 is formed to be the board thickness t (see FIG. 4) of the attraction surface portion 7. The attraction surface portion 7 is formed integrally with the link portion 8 and the collar portion 9.

That is, the standardizing surface portion 5 is punched out in a discoid shape from a sheet of metal and press formed (drawing process) into a circular form having a central aperture 4 at the rotational center thereof. The standardizing surface portion 5 is formed so that its outer diameter is greater than the inner diameter of the attraction surface portion 7. Meanwhile, the attraction surface portion 7 is punched out in a donut shape from a sheet of metal and press formed (drawing process) so that the link portion 9 as well as the collar portion 9 is connected to the outer periphery of the annular attraction surface portion. In addition, a rotational drive aperture (not shown) is provided at an adequate location thereon. The standardizing surface portion 5 is placed on the inner periphery of the annular attraction surface portion 7 so that they are concentric, and the overlapping portions are joined by spot welding or the like, in a state in which is no distortion therebetween.

In a case that the center core is formed integrally, it is formed normally by a sheet of metal having a strong magnetic property such as magnetic stainless steel of a thickness of 0.3 mm, and the step between the standardizing surface portion 5 and the attraction surface portion 7 thereof is drawn to be approximately 0.25 mm. In the present embodiment, by forming the step between the standardizing surface portion 5 and the attraction surface portion 7 by the board thickness t of the attraction surface portion 7, the attraction surface portion 7 is formed by a metal having a board thickness t of 0.25 mm. Accordingly the board thickness becomes thinner, but there is no problem of strength, and in fact use of such a material is advantageous in terms of cost. Note that the board thickness of the standardizing surface portion 5 can be made similarly thin; however, it may be of a different board thickness.

Further, the standardizing surface portion 5 and the attraction surface portion 7 may be formed separately from different materials. For example, the standardizing surface portion may be formed of stainless steel, which has excellent properties against wear, thereby improving the anti-wear property with regard to its contact with the annular protrusion 12 of the spindle 10. Meanwhile, it is preferable that the attraction surface portion 7 may be formed from a ferrite type stainless steel, which has a high magnetic property, thereby securing magnetic attraction force thereof.

In a state where a center core 3 as described above is chucked on the tip of a spindle 10 as shown FIG. 1, the central pin 11 of the spindle 10 is inserted into the central aperture 4 of the standardizing surface portion 5 of the central core 3, thereby accurately positioning the rotational center. The bottom surface of the standardizing surface portion 5 abuts the terminal surface of the annular protrusion 12 of the spindle 10, thereby accurately positioning the height. Further, the upper terminal surface of the magnet 13 of the spindle 10 is provided low, so as to not contact the bottom surface of the attraction surface portion 7 of the center core. The magnet 13 and the center core face each other while maintaining a predetermined distance therebetween. A strong magnetic attraction force is secured, and the magnet 13 attractively holds the center core 3 so that it neither floats upwards nor shifts in a rotational direction during rotational driving thereof.

Note that a drive pin (not shown) to be inserted into the drive pin aperture of the center core 3 is provided at the tip of the spindle 10. This drive pin is provided mainly so as to be able to drive existing magnetic discs with low recording capacities. However, if the spindle is dedicated to driving magnetic discs 1 with high recording capacities as in the present embodiment, the drive pin need not be formed thereon; also, the drive pin aperture need not be formed in the center core 3, and the rotational driving force may be transmitted solely by the magnetic attraction force of the magnet 13.

According to the first embodiment, in order to increase the magnetic attraction force towards the attraction surface portion 7, said attraction surface portion was formed lower than the standardizing surface portion 5 so that said attraction surface portion 7 approaches the magnet 13 of the spindle 10. The attraction surface portion was made lower than the standardizing surface portion 5 by a step formed by the board thickness t of the attraction surface portion 7. Therefore, stable dimensional accuracy and parallelism can be obtained without the distortion associated with a drawing process. Corresponding to improvements in the parallelism and dimensional accuracies of the standardizing surface portion 5 and the attraction surface portion 7, the parallelism and dimensional accuracies of the standardizing surface portion 5 and the collar portion 9 also improve. Thus, stable rotation of the magnetic recording media 2 is performed at a predetermined height in relation to the standardizing position in a flat planar state without vertical movement, which improves the accuracy in the relative position with the magnetic head. Therefore, accuracy in magnetic recordation/reproduction is secured, and reliability is enhanced.

Note that with regard to the magnetic disc 1, it is rotatably housed in a flat case, which is a joined upper shell and lower shell formed of, for example, synthetic resin. The case has a magnetic head insertion opening, and in the central portion of the lower shell is a circular hub aperture of a size that accommodates the standardizing surface portion 5 as well as the attraction surface portion 7, to which the spindle 10 is inserted.

FIG. 5 is a sectional front view of a center core for a magnetic disc according to the second embodiment of the present invention, in a state where it is loaded on a spindle, and FIG. 6 is a magnified sectional edge view of half of the center core shown in FIG. 5.

The magnetic disc 1 comprises a discoid flexible magnetic recording media 2 and a center core 3 for rotational driving fixed to the central portion of the magnetic recording media 2. The center core 3 is held by the magnetic attraction force of a magnet 13 provided at the tip of a spindle 10, and said spindle 10 transmits a rotational driving force to the center core 3.

A central pin 11 is protrusively provided in the center of the tip of spindle 10. An annular protrusion 12 is provided around the periphery of the central pin 11, concentric thereto, and the annular magnet 13 is provided along a further periphery thereof.

The magnetic recording media is provided as a discoid flexible substrate of polyethylene terephthalate or the like having magnetic layers formed on both sides thereof with a central aperture.

The center core 3 is formed by a sheet of metal having a strong magnetic property, such as magnetic stainless steel, being punched out in a predetermined shape and being press formed (drawing process). A discoid standardizing surface portion 5 is formed in a central portion of the center core 3. A central aperture 4 is opened at the rotational center of the standardizing surface portion. An attraction surface portion 7 is formed annularly at the outer periphery of the standardizing surface portion 5, parallel thereto while at a lower position, via a step portion 6. A collar portion 9 is formed as an outwardly extending flange at the outer periphery of the center core 3, parallel to the standardizing surface portion while at a higher position. The inner peripheral edge of the collar portion 9 and the outer peripheral edge of the attraction surface portion 7 are connected by a link portion 8, which is an erect tubular wall.

The central portion of the discoid flexible magnetic recording media 2 is fixed to the lower surface of the collar portion 9 by adhesive or the like. Also, a drive pin aperture (not shown) is provided extending from the standardizing surface portion 5 to the attraction surface portion 7.

With regard to the structure described above, the attraction surface portion 7 is provided with an impact absorption member 20. The impact absorption member 20 is a plastic film (PET or the like), foam film or the like adhesively fixed to the outer surface of the attraction surface portion 7.

FIG. 7 shows an impact absorption member 21 of a fourth embodiment of the present invention. The impact absorption member 21 is a high viscosity impact absorption material such as urethane foam that fills the annular concavity of the inner portion of the attraction surface portion 7.

Note that the impact absorption effect may be increased by the combined effects of providing the film form impact absorption member 20 on the outer surface of the attraction surface portion 7 and providing the impact absorption member 21 formed of a high viscosity impact absorption material on the inner portion thereof.

In a state where a center core 3 as described above is chucked on the tip of a spindle 10 as shown FIG. 1, the central pin 11 of the spindle 10 is inserted into the central aperture 4 of the standardizing surface portion 5 of the central core 3, thereby accurately positioning the rotational center. The bottom surface of the standardizing surface portion 5 abuts the terminal surface of the annular protrusion 12 of the spindle 10, thereby accurately positioning the height. Further, the upper terminal surface of the magnet 13 of the spindle 10 is provided low, so as to not contact the bottom surface of the attraction surface portion 7 of the center core. The magnet 13 and the center core face each other while maintaining a predetermined distance therebetween. A strong magnetic attraction force is secured, and the magnet 13 attractively holds the center core 3 so that it neither floats upwards nor shifts in a rotational direction during rotational driving thereof.

Note that with regard to the magnetic disc 1, although not shown in the figures, it is rotatably housed in a flat case, which is a joined upper shell and lower shell formed of, for example, synthetic resin. The case has a magnetic head insertion opening, and in the central portion of the lower shell is a circular hub aperture of a size that accommodates the standardizing surface portion 5 as well as the attraction surface portion 7, to which the spindle 10 is inserted. In a storage state where the disc is not held by the spindle, the attraction surface portion 7 protrudes from the hub aperture.

Note that a drive pin (not shown) to be inserted into the drive pin aperture of the center core 3 is provided at the tip of the spindle 10. This drive pin is provided mainly so as to be able to drive existing magnetic discs with low recording capacities. However, if the spindle is dedicated to driving magnetic discs with high recording capacities as in the present embodiment, the drive pin need not be formed thereon; also, the drive pin aperture need not be formed in the center core 3, and the rotational driving force may be transmitted solely by the magnetic attraction force of the magnet 13.

According to the third and fourth embodiments, by providing the attraction surface portion 7 with the impact absorption member 20 and/or the impact absorption member 21, the impact received by the disc when it is dropped or the like is absorbed and cushioned by the impact absorption members. Accordingly, the force with which the magnetic recording media 2 collides with the internal surface of the case is reduced, thereby preventing the occurrence of damage thereto. Therefore, the reliability corresponding to the increased recording density of the magnetic media 2 is secured.

What is claimed is:

1. A center core for a magnetic disc which is held by the magnetic attraction force of a magnet provided at the tip of a spindle to which said spindle transmits a rotational driving force comprising:

a standardizing surface portion formed as a disc in the central portion thereof, that abuts the tip surface of said spindle to perform standardizing positioning;

an attraction surface portion formed annularly around the outer periphery of said standardizing surface portion via a step portion so that it is parallel to said standardizing surface portion while of a different height, that faces said magnet provided at said spindle; and a collar portion formed as a flange around an outer periphery thereof, parallel to said standardizing surface portion, that is fixed to the central portion of a discoid magnetic recording media;

wherein said step portion between said standardizing surface portion and said attraction surface portion is of a multiple step drawn form.

2. A center core for a magnetic disc which is held by the magnetic attraction force of a magnet provided at the tip of a spindle to which said spindle transmits a rotational driving force comprising:

a collar portion formed as a flange on the outer periphery thereof, to which a discoid magnetic recording media is fixed;

a standardizing surface portion formed as a disc in a central portion thereof, that abuts the tip surface of said spindle to perform standardizing positioning;

an attraction surface portion formed annularly around an outer periphery of said standardizing surface portion while lower than said standardizing surface portion, that faces said magnet provided at said spindle; and a link portion that links said attraction surface portion and said collar portion;

wherein said standardizing surface portion and said attraction surface portion are formed separately then are joined to each other.

3. A center core for a magnetic disc as defined in claim 2, wherein a height of the step between said standardizing surface portion and said attraction surface is formed by the board thickness of said attraction surface portion.

4. A center core for a magnetic disc which is held by the magnetic attraction force of a magnet provided at the tip of a spindle to which said spindle transmits a rotational driving force comprising:

a collar portion formed as a flange on the outer periphery thereof, to which a discoid magnetic recording media is fixed;

a standardizing surface portion formed as a disc in a central portion thereof, that abuts the tip surface of said spindle to perform standardizing positioning;

an attraction surface portion formed annularly around an outer periphery of said standardizing surface portion while lower than said standardizing surface portion, that faces said magnet provided at said spindle; and a link portion that links said attraction surface portion and said collar portion;

wherein only said attraction surface portion is provided with an impact absorption member.

5. The center core for a magnetic disc as defined in claim 2, wherein said standardizing surface portion and said attraction surface portion are joined to each other by spot welding.

6. The center core for a magnetic disc as defined in claim 3, wherein said standardizing surface portion and said attraction surface portion are joined to each other by spot welding.

* * * * *